United States Patent
Abel et al.

(10) Patent No.: US 10,621,127 B2
(45) Date of Patent: Apr. 14, 2020

(54) COMMUNICATION CHANNEL FOR RECONFIGURABLE DEVICES

(71) Applicant: International Business Machines Corporation, Armonk, NY (US)

(72) Inventors: Francois Abel, Rueschlikon (CH); Christoph Hermann Hagleitner, Wallisellen (CH); Jagath Weerasinghe, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 15/475,388

(22) Filed: Mar. 31, 2017

(65) Prior Publication Data
US 2018/0285295 A1    Oct. 4, 2018

(51) Int. Cl.
| | |
|---|---|
| G06F 13/36 | (2006.01) |
| H04L 29/12 | (2006.01) |
| G06F 13/42 | (2006.01) |
| G06F 13/40 | (2006.01) |
| G06F 21/60 | (2013.01) |
| G06F 9/44 | (2018.01) |
| G06F 9/4401 | (2018.01) |

(52) U.S. Cl.
CPC .......... G06F 13/36 (2013.01); G06F 9/4403 (2013.01); G06F 13/4068 (2013.01); G06F 13/42 (2013.01); G06F 21/606 (2013.01); H04L 61/2015 (2013.01); H04L 61/2038 (2013.01); H04L 61/6022 (2013.01)

(58) Field of Classification Search
None
See application file for complete search history.

(56) References Cited

U.S. PATENT DOCUMENTS

| | | | |
|---|---|---|---|
| 8,179,159 B1 | 5/2012 | Trimberger et al. | |
| 2003/0074579 A1* | 4/2003 | Della-Libera | .......... H04L 45/02 726/1 |
| 2010/0061242 A1 | 3/2010 | Sindhu et al. | |

(Continued)

OTHER PUBLICATIONS

Knodel et al. ("RC3E: Reconfigurable Accelerators in Data Centres and their Provision by Adapted Service Models", 2016, pp. 19-26).*

(Continued)

*Primary Examiner* — Idriss N Alrobaye
*Assistant Examiner* — Dayton Lewis-Taylor
(74) *Attorney, Agent, or Firm* — Harrington & Smith

(57) ABSTRACT

A communication channel for reconfiguration of a device, such as an FPGA, is described in various embodiments. One embodiment includes a physical input/output circuit, a dynamic layer, and a static layer. The static layer is programmed into the reconfigurable device to contain a configuration layer and a network layer. The configuration layer is able to receive additional layers, such as a virtual network layer and a virtual security layer and program them into the reconfigurable device. The virtual network layer can provide communication protocols, such as TCP/IP, and the virtual security layer can provide security protocols, such as TLS and IPSec. Various distributed applications can be programmed into the reconfigurable device over the network and configured to use the virtual network layer and the virtual security layer.

19 Claims, 7 Drawing Sheets

(56) References Cited

U.S. PATENT DOCUMENTS

2012/0173604 A1 7/2012 Inoue
2014/0351811 A1 11/2014 Kruglick

OTHER PUBLICATIONS

Lieber ("FPGA Communication Framework for Communication, Debugging, Testing, and Rapid Prototyping", Jun. 29, 2011, 103 pages).*
Lu et al. ("IPSec Implementation on Xilinx Virtex-II Pro FPGA and Its Application", Apr. 5, 2005, 7 pages).*
Perera et al. ("FPGA-Based Reconfigurable Hardware for Compute Intensive Data Mining Applications", 2011, pp. 100-108).*
Spoorthi et al. ("DHCP Implementation in a NIOS Processor", Jul.-Dec. 2016, pp. 14-22).*
Bunker, Trevor, et al., "Latency-Optimized Networks for Clustering FPGAs", https://cseweb.ucsd.edu/~swanson/papers/FCCM2013Network, Apr. 11, 2013, 8 pgs.
Weerasinghe, Jagath, et al., "Enabling FPGAs in Hyperscale Data Centers", https://www.researchgate.net/publication/280942625_Enabling_FPGAs_in_Hyperscale_Data_Centers; Aug. 2015, 10 pgs.
Leopold, George, "Microsoft Accelerates Datacenter With FPGAs", http://www.enterprisetech.com/2015/02/23/microsoft-aceleerates-dtacenter-with-fpgas/, Feb. 23, 2015, 3 pgs.
Plessl, Christian, et al., "Virtualization of Hardware—Introduction and Survey", Proc. Int. Conf. on Engineering of Reconfigurable Systems and Algorithms (ERSA), CSREA Press, 2004, 7 pgs.
Unnikrishnan, D. et al., "Reclick—A Modular Dataplane Design Framework for FPGA-Based Network Virtualization", Proceedings—2011 7th ACM/IEEE Symposium on Architectures for Networking and Communication Systems, ANCS 2011 145-155 10.1109/ANCS.2011.31.
Markettos, A. Theodore, et al., "Interconnect for commodity FPGA clusters: standardized or customized?", 24th Inernational Conference on Field Programmable Logic & Applications, (FPL), Sep. 2011, 8 pgs.
Alachiotis, Nikolaos, et al., "A Versatile UDP/IP based PC—FPGA Communication Platform", 2012 International Conference on Reconfigurable Computing and FPGAs (ReConFig), Dec. 2012, 6 pgs.
Koch, Dirk, et al., "Efficient Reconfigurable On-Chip Buses for FPGAs", Conference paper, FCCM, Apr. 2008.
Koh, Shannon, et al., "COMMA: A Communication Methodology for Dynamic Module Reconfiguration in FPGAs (Extended Abstract)", http://www.cse.unsw.com.au/~odiessel/papers/fccm06koh.pdf; FCCM 2006, 2 pgs.
Dollas, Apostolos, et al., "An Open TCP/IP Core for Reconfigurable Logic", 13th Annual IEEE Symposium on Field-Programmable Custom Computing Machines, FCCM, May 2005, 2 pgs.
Unnikrishnan, Deepak, et al., "Reconfigurable Data Planes for Scalable Network Virtualization", IEEE Transactions on Computers, Dec. 2013, 14 pgs.
Perera, Darshika G., et al., "FPGA-Based Reconfigurable Hardware for Compute Intensive Data Mining Applications", 2011 IEEE International Conference on P2P, Parallel, Grid, Cloud and Intensive Data Mining Applications, 2011, pp. 100-108.

* cited by examiner

COMMUNICATION CHANNEL FOR RECONFIGURABLE DEVICES

FIELD OF TECHNOLOGY

The present invention relates to the technical field of communication channels for reconfigurable devices, such as field-programmable gate arrays.

BACKGROUND OF THE INVENTION

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Increasing numbers of network connected devices are appearing and supplanting some of the functions that have traditionally been provided by general purpose processors. For example, individual accelerators that provide parallel data operations as well as other functions are presently available. While such devices typically do not exhibit the full range of hardware and software found on most general purpose computers, they are often implemented in accordance with the same general architecture: a processing element, a form of memory, an application program, and a communication interface. The processing element is generally optimized for a particular operation, such as vector arithmetic and or parallel data processing and includes a specialized instruction processing pipeline. However, many of the performance-enhancing features of the device are underused due to difficulties with the communication interface. That is, the devices may be relatively inexpensive to engineer, but inefficient in terms of resource utilization and performance.

Field-programmable gate arrays (FPGAs) are frequently used in communications, data processing, data storage and other applications. The appealing characteristics of FPGAs are programmability for design flexibility. As compared to a conventional stored program processor arrangement, however, the re-programmability of an FPGA is less convenient. For example, to upgrade a program in a stored program processor arrangement, the operating system can be used to replace a program file. An FPGA, in contrast, generally requires special hardware to provide a configuration bitstream to the FPGA. Thus, specialized hardware and software to use the reconfigurable nature of the FPGA must be carefully designed.

Heterogeneous workloads are moving to cloud datacenters (DC). For improving overall DC power efficiency and the workload performance, these workloads are increasingly using hardware accelerators, such as FPGAs. These workloads are distributed and run at different scales. Therefore, to comply with the distributed nature of the applications in the DCs, mapping of large distributed applications on to multiple FPGAs is indispensable. The distributed application can be configured to distribute the computational workload to the FPGAs over the network switch. Multiple servers may also connect to a network switch, and the distributed application can take advantage of the computing resources available.

Further, even if an application fits in an expensive high-end FPGA, mapping that application on to multiple cheap low-end FPGAs leads to improvements to the infrastructure cost. By moving the application to use multiple FPGAs, it may be possible to use lower cost components to meet the design goals.

When building multi-FPGA systems, almost all of the related work focuses on inter-FPGA communication in a fixed topology, where a number of FPGAs are soldered on a board or connected in a predetermined topology in a network. In addition, there are multiple instances of work related to network-attached FPGAs, such as (i) Net-FPGA and (ii) Network-Attached FPGAs for Data Center Applications. In these network-attached FPGAs, Ethernet-based (mainly) network protocol stacks have been implemented. But, these network protocol stacks are not virtualized and do not provide security on top of it.

What is needed is a flexible, user defined topology that is adaptable to the application requirements.

SUMMARY OF INVENTION

Embodiments of a communication channel to interconnect multiple FPGAs together into a multi-FPGA fabric in DC networks are disclosed. This communication channel, in embodiments, is secure, virtual, and reconfigurable. The communication channel includes a security layer. The communication channel can have one or more virtual communication channels, including different network and security protocols. Furthermore, the communication channel is non-disruptively reconfigurable.

In embodiments, the present invention differs from network-attached computing devices (such as CPUs, SoCs, and GPUs) by its reconfigurable nature. The invention, in other embodiments, differs from network-attached reconfigurable systems (such as FPGA cards) by its absence of secure and virtualized protocol stacks. These differences allow for the secure interconnect of multiple FPGAs in flexible topologies and allows for dynamic configuration of network and security protocol stacks on demand.

In embodiments, a field-programmable gate array comprises an integrated input/output (I/O) device operatively connected to a computer network, a static region comprising a configuration layer, and a network layer, and a dynamic region comprising a communication channel comprising a virtual security layer and a virtual networking layer, wherein the virtual security layer provides at least one security protocol and an application interface, and wherein the virtual network layer provides network protocol stacks and interfaces between the virtual security layer and the network layer.

In an optional embodiment, the virtual network layer comprises a networking stack, where the networking stack may be one of TCP, UDP, or a custom networking protocol.

In another optional embodiment, the virtual security layer comprises a security protocol selected from the group consisting of the TLS protocol, the DTLS protocol, the IPSec protocol, or a custom security protocol stack.

In a preferred embodiment, the configuration layer is configured to receive a distributed application and program the distributed application into the dynamic layer. In further preferred embodiments, the distributed application is configured to communicate using the application interface of the virtual security layer.

In an embodiment, a method for programming a field-programmable gate array comprises generating a static bit stream containing a NET layer and a CONF layer for an FPGA, storing the generated static bit stream in a flash memory of the FPGA, booting the FPGA from the static bit stream, setting an IP address for the FPGA from a DHCP server via the NET layer, and receiving a partial bit stream for a virtual network layer programming the partial bit stream for a for a virtual network layer into the FPGA to generate a virtual network layer. An optional embodiment may further comprise the step of configuring a MAC and an IP address for the virtual network layer. Another optional embodiment may further comprise the step of receiving a partial bit stream for a virtual security layer and programming the partial bit stream for a virtual security layer into the FPGA to generate a virtual security layer. A further optional embodiment may comprise the additional step of receiving a partial bit stream for an APP and programming the partial bit stream for an APP into the FPGA to generate an APP.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

In accordance with various embodiments of the invention, a configuration bitstream that implements a protocol consistent with a selected communications channel is used to configure a device. For example, in one embodiment a TCP/IP stack is implemented in the device by the configuration bitstream. Depending on the particular application to be implemented (i.e., the function to be performed by the device), both the communications protocol and the application may be implemented on the device. Alternatively, the application may be implemented in another device, or in a plurality of device. A configuration control circuit is coupled to the device (s) to initially configure the device (s) and to assist in reconfiguration of the device (s) via the communications channel.

Figure 1:
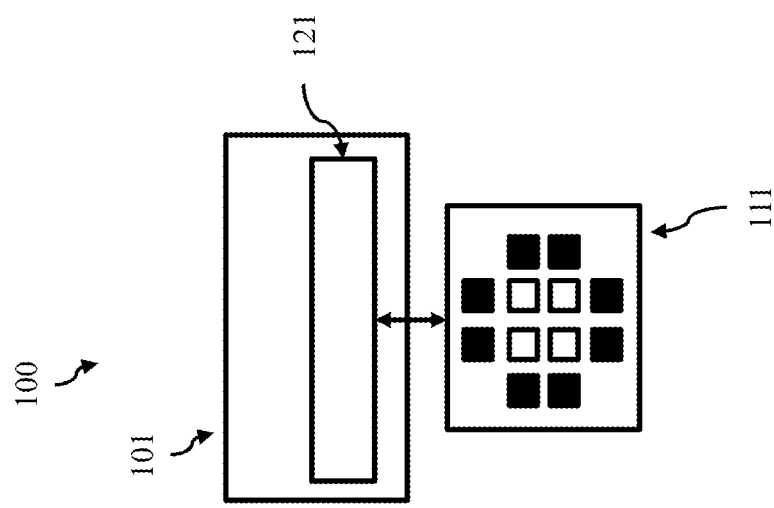
FIG. 1 illustrates a single FPGA network topology, according to an embodiment.
Figure 2:
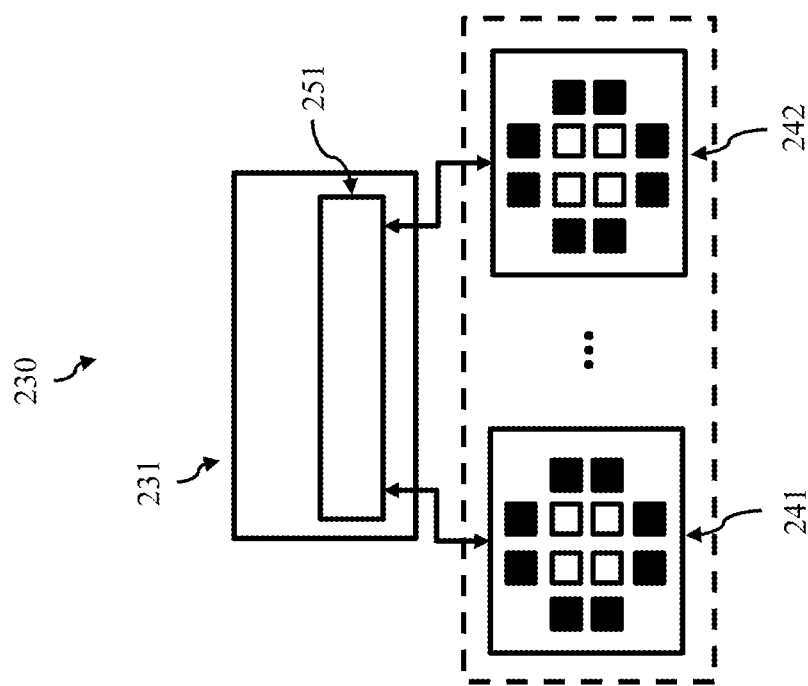
FIG. 2 illustrates a multi-FPGA network topology, according to an embodiment.
Figure 3:
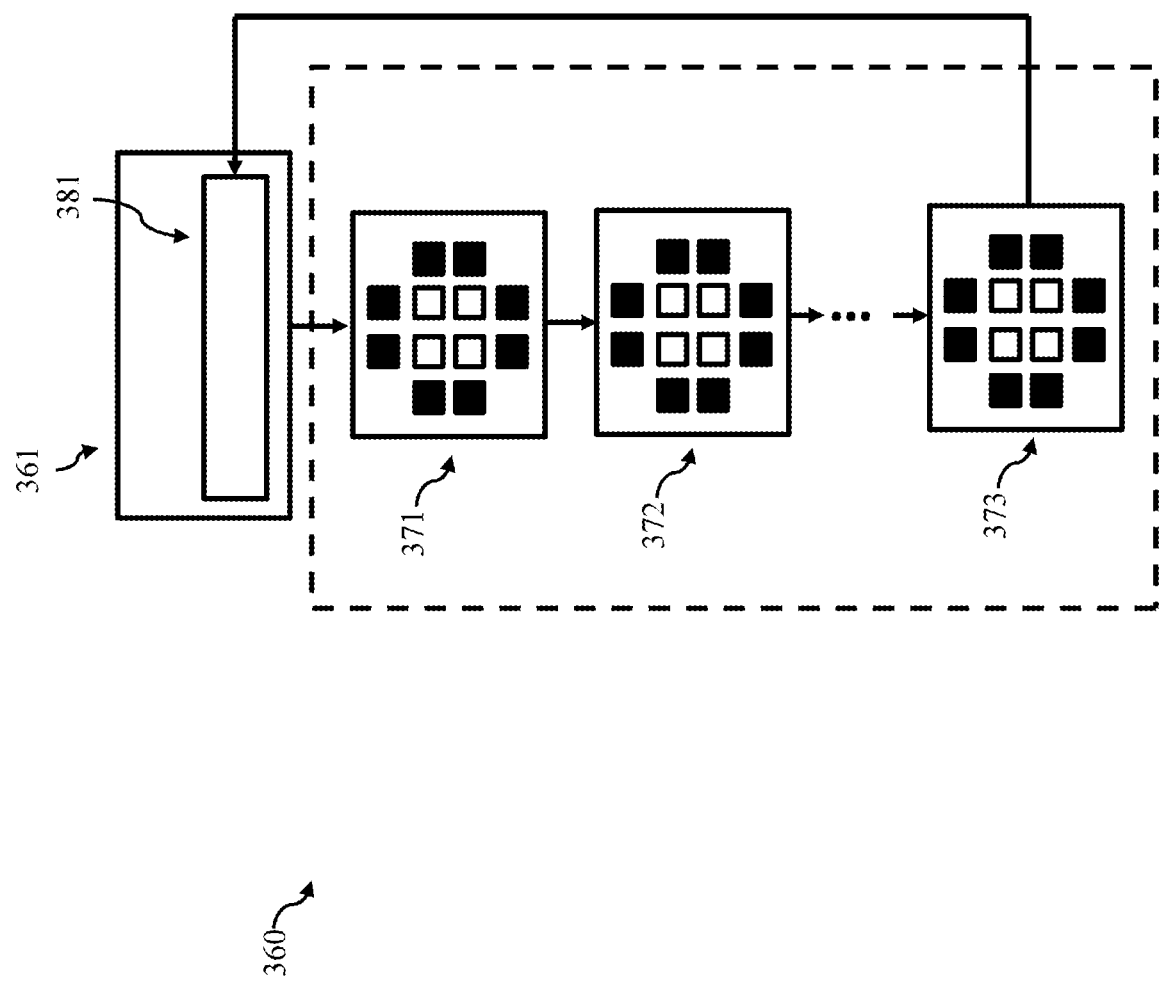
FIG. 3 illustrates an alternative multi-FPGA network topology, according to an embodiment.
Figure 4:
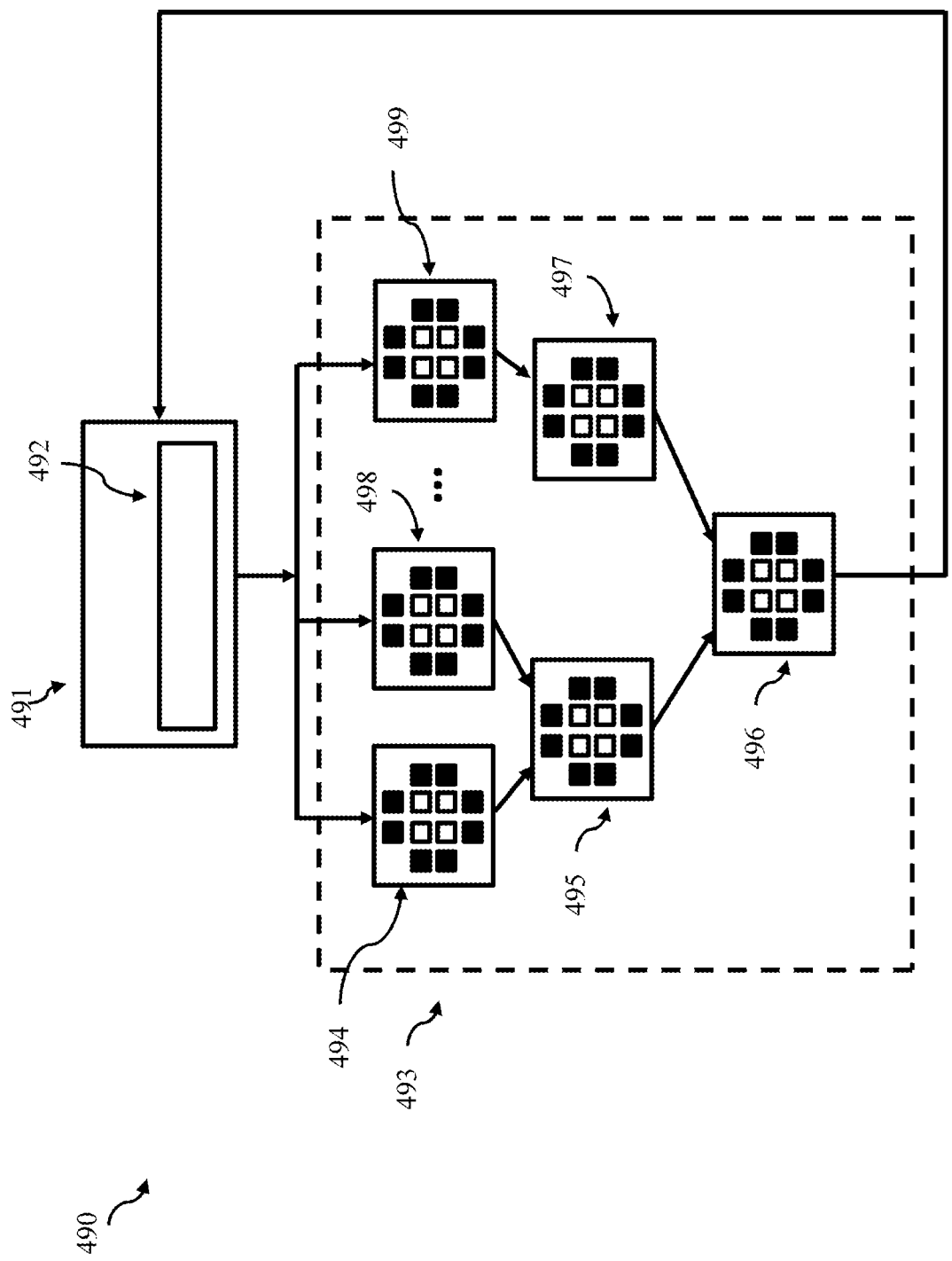
FIG. 4 illustrates a further alternative multi-FPGA network topology, according to an embodiment.

In example embodiments, the present invention can be used in various network topologies with clusters of FPGAs or other reconfigurable devices that are connected to a datacenter network switch. FIG. 1 illustrates a single FPGA network topology 100, according to an embodiment. The central processing unit 101 runs a software application 121 that communicates with a single FPGA 111. FIG. 2 illustrates a multi-FPGA network topology 230, according to an embodiment. In this configuration, there are multiple FPGAs 241, 242. Although two are shown, there may be several FPGAs. Each FPGA communicates directly to a software application 251 that runs on a central processing unit 231. That is, the FPGA fabric has been arranged to allow the direct communication to the software application. FIG. 3 illustrates an alternative multi-FPGA network topology 360, according to an example embodiment of the present invention. Also in this configuration, there are multiple FPGAs 371, 372, 373. In this FPGA fabric configuration, the software application 381, which runs on a central processing unit 361, transmits data to the first FPGA 371, which communicates in a serial fashion with the next FPGA 372 in the chain. The FPGA node 373 provides the processing results to the CPU 361 and software application 381. The architecture disclosed herein makes it possible to interconnect multiple FPGAs together in flexible and user-defined topologies according to the application requirements. The key enabler for such an FPGA infrastructure is the network-attachment of FPGAs in DCs. FIG. 4 illustrates another multi-FPGA network topology 490, according to an example embodiment of the present invention. In this embodiment, the FPGA fabric 493 comprises a tree topology. The FPGAs 494-499 in the FPGA fabric 493 comprise a tree topology. A single FPGA node 496 provides the processing results to the CPU 491 and software application 492.

Figure 5:
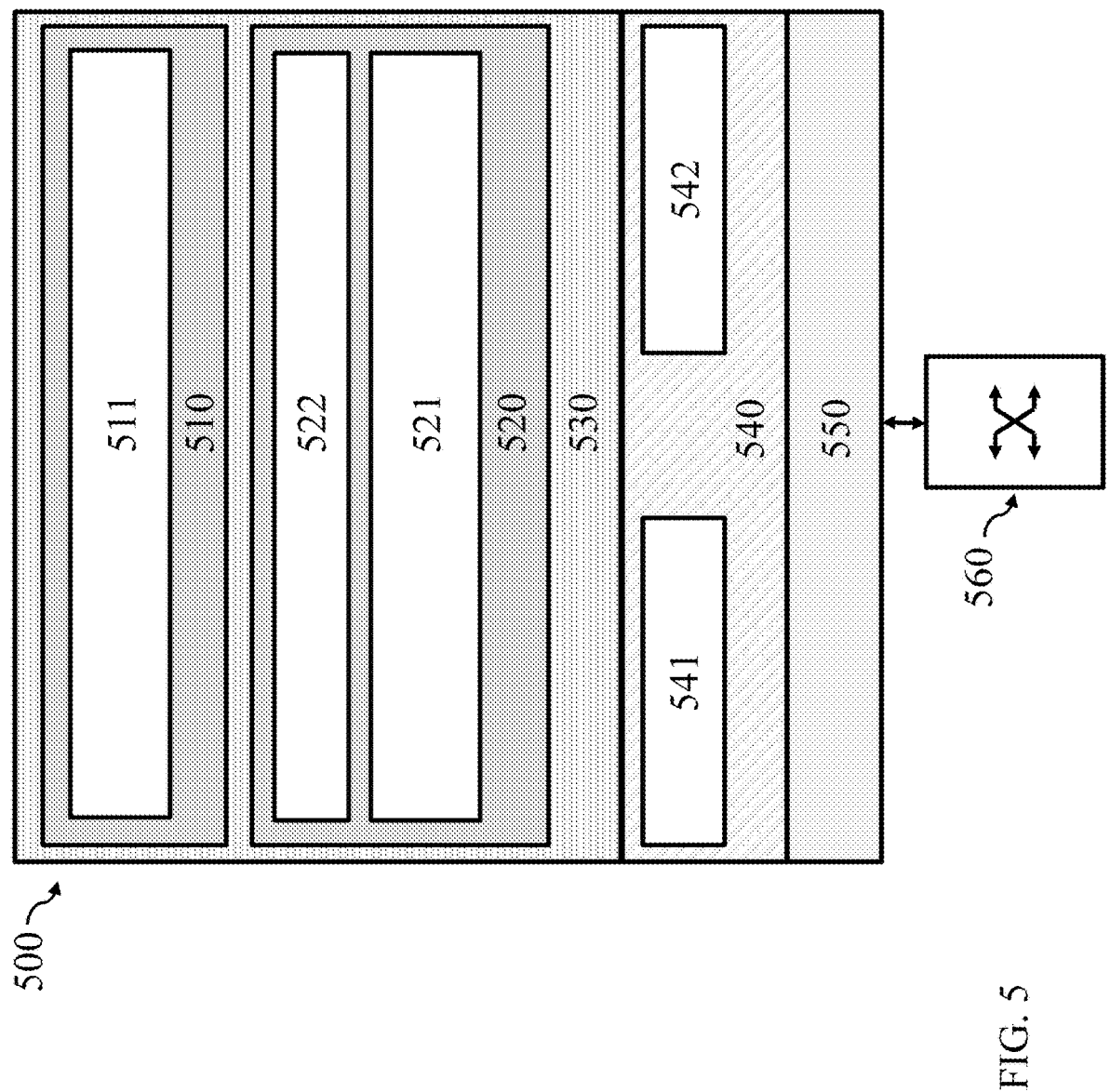
FIG. 5 illustrates a communication channel to interconnect multiple FPGAs, according to an embodiment of the present invention.

FIG. 5 illustrates an FPGA 500 with a communication channel to interconnect multiple FPGAs, according to an example embodiment of the present invention. The FPGA is partitioned into two main parts. One part is referred to as the static region 540, which is configured only once at the device boot time and exists during the life time of the last application (APP) 511 running in the FPGA. The other part is called the dynamic region 530. The dynamic region 530 is divided into two parts: an application layer 510 and a communication channel 520. The application layer hosts datacenter applications and is configured dynamically to add a new application (APP) 511 in the application layer 510. The communication channel 520 includes two layers: a virtualized network layer (VNL) 521 that provides virtual network protocol stacks on demand and a virtualized security layer (VSL) 522 that provides multiple security protocols on demand. The virtualized network layer (VNL) 521 can support various networking protocols, such as TCP and UDP, or can be configured to support a custom networking protocol defined by the user. Likewise, the virtualized security layer (VSL) 522 can support security protocols such as the TLS protocol, the DTLS protocol, and the IPSec protocol. The virtualized security layer (VSL) 522 can also be programmed to include a custom security protocol defined by the user.

In the static part 540, the system implements a NET layer 541 and a CONF layer 542. The NET layer 541 provides the access to the network. The CONF layer is used to configure the APP(s) 511. The CONF 542 layer accesses the network directly through the NET layer 541, whereas APP(s) 511 access the network through the communication channel 520, which in turn access the network through the NET layer 541. The FPGA 500 further includes the integrated I/O 550 on the device, which physically interfaces to the datacenter network through, for example, a switch 560.

Figure 6:
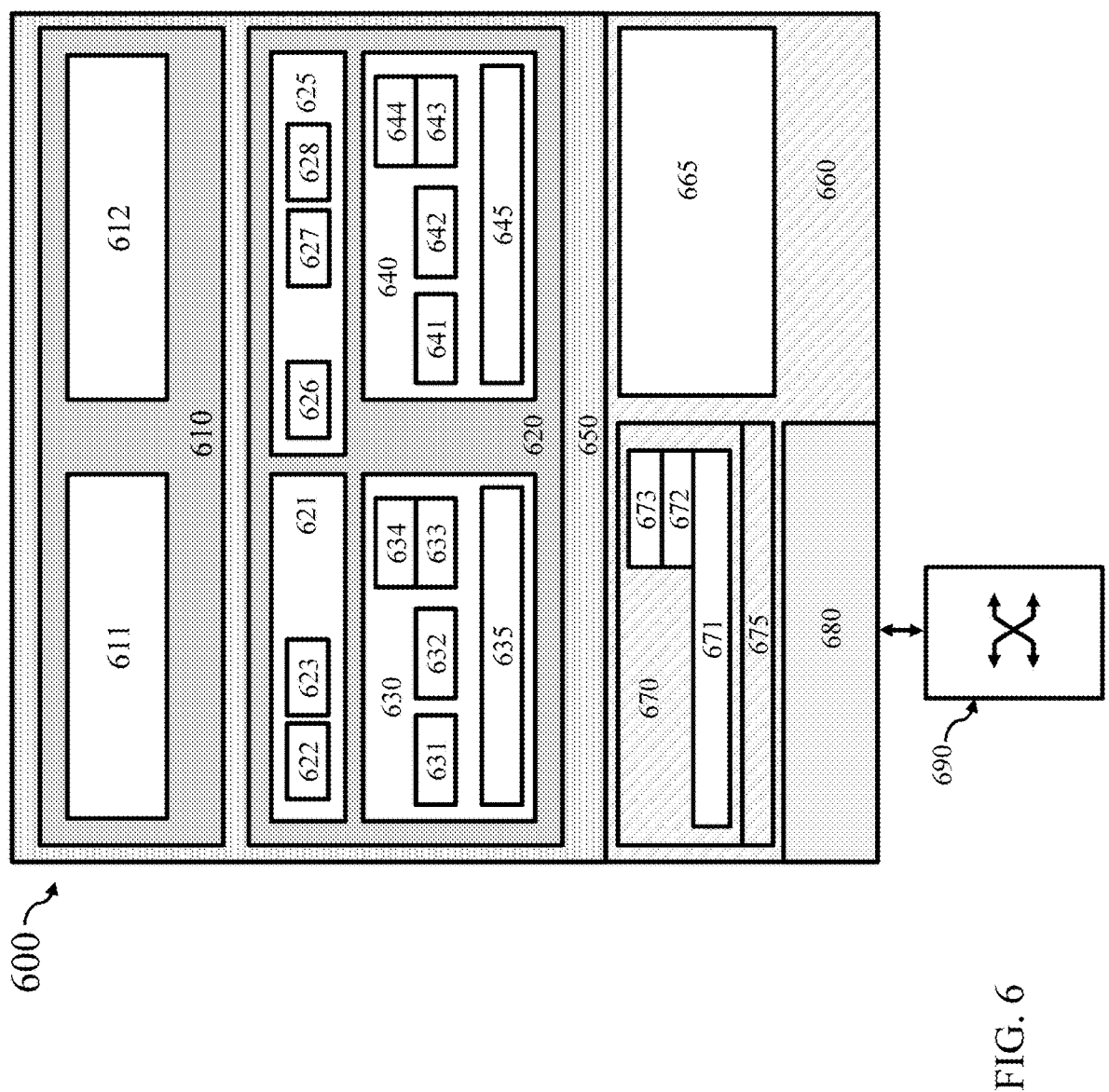
FIG. 6 illustrates an alternative communication channel configuration to interconnect multiple FPGAs, according to an embodiment of the present invention.
Figure 7:
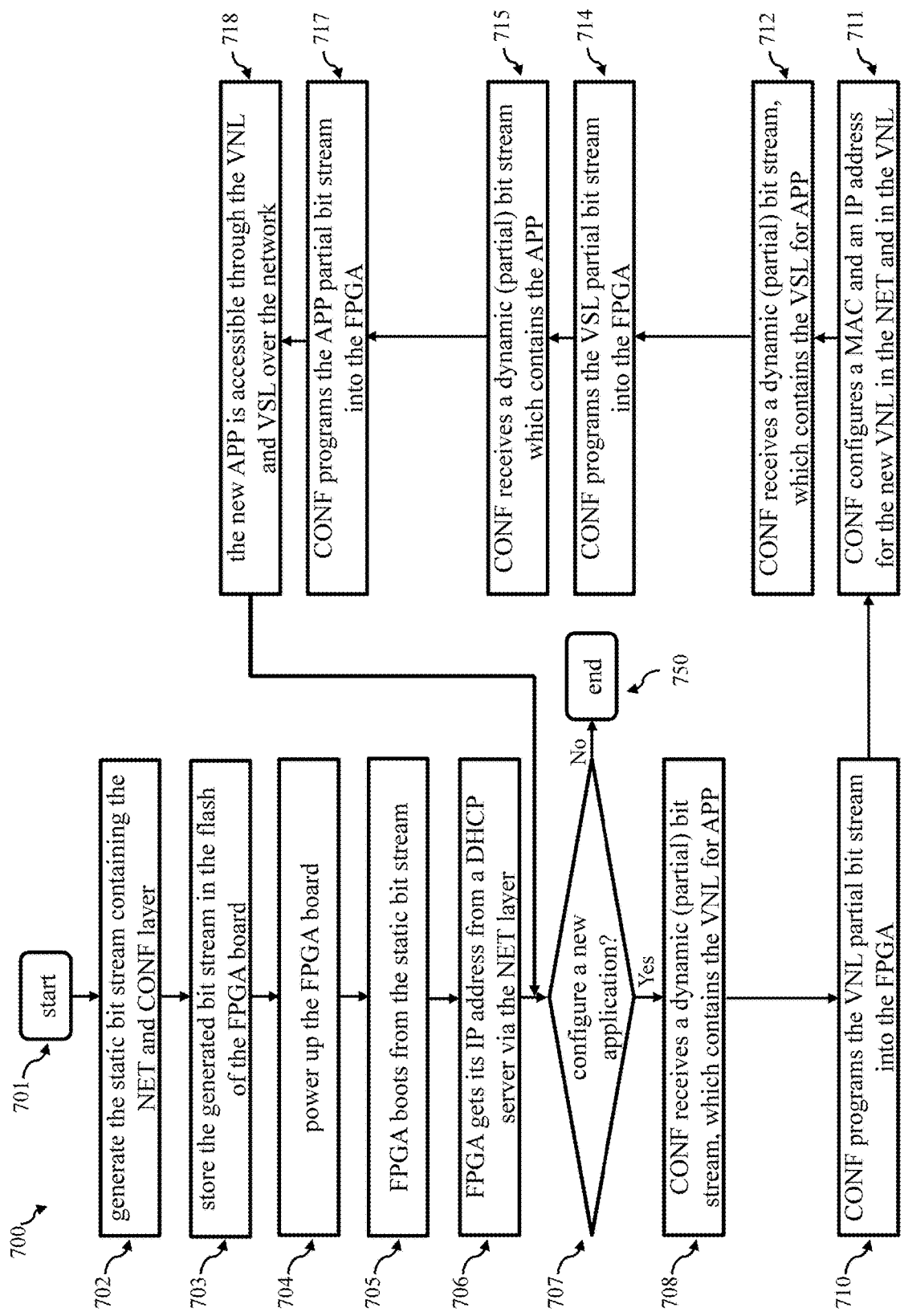
FIG. 7 illustrates a flow of configuring VNL and VSL for an APP, according to an embodiment of the present invention.

FIG. 6 illustrates an FPGA 600 with an alternative communication channel configuration to interconnect multiple FPGAs, according to an example embodiment of the present invention. As shown in FIG. 6, the dynamic region 650 is divided into two parts: an application layer 610 and a communication channel 620. Each application 611, 612 can have one or more VNLs 630, 640 and VSLs 621, 625 in the communication channel. In FIG. 6, the applications 611, 612, the VNLs 630, 640 and the VSLs 621, 625 are independently reconfigurable. The process 700 for programming and configuring a new VNL and VSL into the FPGA is shown in FIG. 7. In this configuration, the static region 660 contains a NET layer 670, a MAC layer 675, and a CONF layer 665. The NET layer contains a switch layer 671, a TCP layer 673, and an IP layer 672.

In an embodiment, the first VNL 630 can contain a TCP element 631, a first UDP element 632, and a RoCEv2 element 634 connected to a second UDP element 633. The first VNL can also have a L3 (IP) protocol stack supporting element 635. The first VSL 621 can contain a TLS element 622 and a DTLS element 623. The second VNL 640 can contain a TCP element 641, a first UDP element 642, and a UDT/QUIC element 644 connected to a second UDP element 643. The second VNL can also have a L3 (IP) protocol stack supporting element 645. The second VSL 621 can contain an IPSec element 626 and a pair of custom elements 627, 628. The FPGA 600 further consists of the integrated I/O 680 on the device, which physically interfaces, such as via an Ethernet connection, to the datacenter network through, for example, a switch 690.

FIG. 7 illustrates a flow 700 of configuring VNL and VSL for an APP, according to an example embodiment of the present invention. In step 701, the process begins. In step 702, a static bit stream containing the NET and CONF layers is generated. In step 703, the generated bit stream is stored in the flash memory of the FPGA. In step 704, the FPGA board is powered up, and boots from the static bit stream in step 705. In step 706, the FPGA gets its IP address from a DHCP server via the NET layer. If the system selects to configure a new application in step 707, the process continues to step 708, where CONF receives a dynamic (partial) bit stream that contains the VNL for the APP. Otherwise, the process ends in step 750. In step 710, CONF requests the flash to program the partial bit stream into the FPGA. CONF can program the partial bit stream directly or store it in flash memory for programming. In step 711, CONF configures a MAC address and an IP address for the new VNL in the NET and in the VNL. In step 712, CONF receives a dynamic (partial) bit stream, which contains the VSL for the APP. In step 714, CONF request the flash to program the partial bit stream into the FPGA. In step 715, CONF receives a dynamic (partial) bit stream which contains the APP. In step 717, CONF request the flash to program the partial bit stream into the FPGA. In step 718, the new APP is accessible through the VNL and VSL over the network, and the process returns to step 707.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing written description enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A field-programmable gate array comprising:
  an integrated input/output device operatively connected to a computer network;
  a static region comprising:
    a configuration layer, and
    a network layer connected to the integrated input/output device; and
  a dynamic region comprising a communication channel comprising a virtual security layer and a virtual networking layer, wherein the virtual security layer provides at least one security protocol and an application interface, and wherein the virtual network layer provides network protocol stacks and interfaces between the virtual security layer and the network layer, and the virtual network layer and virtual security layer are configured to provide access by an application to the computer network in response to the application being programmed into the dynamic region.

2. The field-programmable gate array of claim 1, wherein the virtual network layer comprises a networking stack.

3. The field-programmable gate array of claim 2, wherein the networking stack is selected from the group consisting of a transmission control protocol (TCP) networking stack and a user datagram protocol (UDP) networking stack.

4. The field-programmable gate array of claim 2, wherein the networking stack comprises a custom networking protocol stack.

5. The field-programmable gate array of claim 1, wherein the virtual security layer comprises a security protocol element selected from the group consisting of a transport security later (TLS) protocol, a datagram transport layer security (DTLS) protocol, and an Internet protocol security (IPSec) protocol.

6. The field-programmable gate array of claim 1, wherein the virtual security layer comprises a custom security protocol stack.

7. The field-programmable gate array of claim 1, wherein the configuration layer is configured to receive the application and program the application into the dynamic region.

8. The field-programmable gate array of claim 7, wherein the application is configured to communicate through the computer network using the application interface of the virtual security layer.

9. A method for programming a field-programmable gate array (FPGA) comprising:
  generating a static bit stream containing a network (NET) layer and a configuration (CONF) layer for the FPGA;
  storing the generated static bit stream in a flash memory of the FPGA;
  booting the FPGA from the static bit stream;
  setting an internet protocol (IP) address for the FPGA from a dynamic host configuration protocol (DHCP) server via the NET layer;
  receiving a first partial bit stream for a virtual network layer;
  receiving a second partial bit stream for a virtual security layer;
  programming the first partial bit stream for the virtual network layer into the FPGA to generate a virtual network layer that can be used by an application in response to the application being programmed into the FPGA; and
  programming the second partial bit stream for the virtual security layer into the FPGA to generate a virtual security layer that can be used by the application in response to the application being programmed into the application layer.

10. The method of claim 9, further comprising:
configuring a medium access control (MAC) and an Internet protocol (IP) address for the virtual network layer.

11. The method of claimer 10, further comprising:
receiving a partial bit stream for an application (APP) and programming the partial bit stream for an APP into the FPGA to generate an APP, wherein the APP is accessible through the virtual network layer and virtual security layer over a network to which the virtual network layer is coupled.

12. A system comprising:
  a computer communication network;
  a reconfigurable device connected to the computer communication network by an integrated input/output element and having a static region and a dynamic region, wherein the static region comprises a configuration layer that is configured to receive a virtual security layer bitstream, a virtual network layer bitstream, and an application, wherein the configuration layer is further configured to program the virtual security layer bitstream, the virtual network layer bitstream, and the application into the reconfigurable device, and the virtual network layer and virtual security layer are configured to provide access by the application to the computer communication network.

13. The system of claim 12, wherein the virtual network layer comprises a networking stack.

14. The system of claim 13, wherein the networking stack is selected from the group consisting of a transmission control protocol TCP) networking stack and a user datagram protocol (UDP) networking stack.

15. The system of claim 13, wherein the networking stack comprises a custom networking protocol stack.

16. The system of claim 12, wherein the virtual security layer comprises a security protocol element selected from the group consisting of a transport security later (TLS) protocol, a datagram transport layer security (DTLS) protocol, and an Internet protocol security (IPSec) protocol.

17. The system of claim 12, wherein the virtual security layer comprises a custom security protocol stack.

18. The system of claim 12, wherein the application is configured to communicate using the application interface of the virtual security layer.

19. The system of claim 12, wherein the integrated input/output element connects to an IP based network.

* * * * *